(12) United States Patent
Que et al.

(10) Patent No.: US 8,770,822 B2
(45) Date of Patent: Jul. 8, 2014

(54) BACKLIGHT MODULE AND A BACKLIGHT DEVICE

(75) Inventors: Chengwen Que, Shenzhen (CN); Yicheng Kuo, Shenzhen (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 312 days.

(21) Appl. No.: 13/318,782

(22) PCT Filed: Sep. 19, 2011

(86) PCT No.: PCT/CN2011/079831
§ 371 (c)(1),
(2), (4) Date: Nov. 4, 2011

(87) PCT Pub. No.: WO2013/007064
PCT Pub. Date: Jan. 17, 2013

(65) Prior Publication Data
US 2013/0010499 A1    Jan. 10, 2013

(51) Int. Cl.
*F21V 7/04* (2006.01)
(52) U.S. Cl.
USPC ............... 362/634; 349/58; 349/68; 362/294; 362/612; 362/628; 362/631
(58) Field of Classification Search
USPC ...................... 349/58, 65; 362/294, 612, 628, 362/631–634
See application file for complete search history.

(56) References Cited

U.S. PATENT DOCUMENTS 7,360,940 B2 *  4/2008  Chang et al. ............... 362/631
7,771,108 B2 *  8/2010  Iwasaki ....................... 362/634

FOREIGN PATENT DOCUMENTS

| CN | 200955715 | Y | 10/2007 |
| CN | 101109864 | A | 1/2008 |
| CN | 101943352 | A | 1/2011 |
| CN | 102042534 | A | 5/2011 |
| JP | 2003107467 | A | 4/2003 |
| JP | 2004184493 | A | 7/2004 |
| KR | 20080102099 | A | 11/2008 |

* cited by examiner

*Primary Examiner* — Stephen F Husar

(57) ABSTRACT

The utility model relates to a technology field of liquid crystal display, and more particularly to a backlight module and a backlight device. The backlight module provided by the utility model comprises a light guide plate, a printed circuit board, a heat-dissipating bracket and a first retaining member. There has an optical-coupling distance between a light incidence surface of the light guide plate and the printed circuit board. The light incidence surface of the light guide plate disposes more than two light guide plate protrusions thereon. The first retaining member retains the heat-dissipating bracket, the printed circuit board and the light guide plate together to form an independent module. The technical solution of the utility model can enhance the stability of the optical-coupling distance in the backlight module, realize a simple modularization assembly, simplify a mounting process of the back plate, and improve the assembly convenience.

7 Claims, 4 Drawing Sheets

BACKLIGHT MODULE AND A BACKLIGHT DEVICE

BACKGROUND OF THE UTILITY MODEL

1. Field of the Utility Model

The utility model relates to a technology field of liquid crystal display, and more particularly to a backlight module and a backlight device.

2. Description of the Prior Art

With the development of technology, an LCD (Liquid Crystal Display) gradually becomes a popular display. A backlight module is one important optical assembly of the LCD for providing light source, and mainly includes a light source, a light guide plate, optical films, a back plate, a heat-dissipating bracket and so on. The light guide plate and the optical films are in order positioned on the back plate, and the light source is positioned on one side (namely a light incidence surface) of the light guide plate.

The traditional guide light plate is fixed by the engagement of structures formed on the back plate and grooves or protrusions formed around the back light plate. Considering an expansive problem that appears when the material of the light guide plate is affected by the external environment, an enough gap often needs to be remained on the position of fixing the light guide plate for allowing it to expand or contract during designing the light guide plate. But because of the existing of the gap, the distance (namely the optical-coupling distance) between the light guide plate and the light source may be varied so that it cannot ensure the stability of the optical-coupling distance and directly affects the optical quality of a liquid crystal display module.

Hence, it is necessary to provide a backlight module to solve the above problem existed in the prior art.

BRIEF SUMMARY OF THE UTILITY MODEL

The utility model is to provide a backlight module and a backlight device for solving the problem of the non-stability of the optical-coupling distance affecting the optical quality of a liquid crystal display module due to the prior fixing mode of the light guide plate.

An object of the utility model is to provide a backlight module and a backlight device, which can enhance the stability of the optical-coupling distance, realize a modularization assembly, simplify a mounting process of a back plate, and improve the assembly convenience.

To achieve the aforementioned object or other objects of the utility model, the utility model adopts the following technical solutions.

In one preferred embodiment of the utility model, a backlight module is provided. The backlight module comprises a light guide plate, a printed circuit board, a heat-dissipating bracket and a first retaining member. There has an optical-coupling distance between a light incidence surface of the light guide plate and the printed circuit board. The light incidence surface of the light guide plate disposes more than two light guide plate protrusions thereon, and each of the light guide plate protrusions is provided with a tapping hole. The printed circuit board is provided with more than two first through holes, the heat-dissipating bracket is provided with more than two second through holes, and the first and second through holes are corresponding to the tapping hole. The first retaining member passes through the second through hole, the first through hole and the tapping hole for retaining the heat-dissipating bracket, the printed circuit board and the light guide plate together to form an independent module.

In one preferred embodiment of the utility model, at least one of the first through holes and at lease one of the second through holes are designed as an aligning hole, and the other through holes are designed to have an offset compensating gap.

In one preferred embodiment of the utility model, the height of the light guide plate protrusions is equal to the sum of the thickness of one light-emitting body disposed on a front surface of the printed circuit board and the optical-coupling distance.

The utility model also provides a backlight module, comprising a light guide plate, a printed circuit board, a heat-dissipating bracket and a first retaining member. There has an optical-coupling distance between a light incidence surface of the light guide plate and the printed circuit board. The light incidence surface of the light guide plate disposes more than two light guide plate protrusions thereon. The first retaining member retains the heat-dissipating bracket, the printed circuit board and the light guide plate together to form an independent module.

In one preferred embodiment of the utility model, each of the light guide plate protrusions is provided with a tapping hole.

In one preferred embodiment of the utility model, the printed circuit board is provided with more than two first through holes, the heat-dissipating bracket is provided with more than two second through holes, and the first and second through holes are corresponding to the tapping hole.

In one preferred embodiment of the utility model, at least one of the first through holes and at lease one of the second through holes are designed as an aligning hole, and the other through holes are designed to have an offset compensating gap.

In one preferred embodiment of the utility model, the height of the light guide plate protrusions is equal to the sum of the thickness of one light-emitting body disposed on the printed circuit board and the optical-coupling distance.

The utility model also provides a backlight device, comprising a light guide plate, a printed circuit board, a heat-dissipating bracket, a reflection sheet, a back plate, a first retaining member and a second retaining member. There has an optical-coupling distance between a light incidence surface of the light guide plate and the printed circuit board. The light incidence surface of the light guide plate disposes more than two light guide plate protrusions thereon. The first retaining member retains the heat-dissipating bracket, the printed circuit board and the light guide plate together to form an independent backlight module, and the second retaining member is used to connect and retain the back plate, the reflection sheet and the backlight module.

In one preferred embodiment of the utility model, each of the light guide plate protrusions is provided with a tapping hole, the printed circuit board is provided with more than two first through holes, the heat-dissipating bracket is provided with more than two second through holes, and the first and second through holes are corresponding to the tapping hole.

In one preferred embodiment of the utility model, at least one of the first through holes and at lease one of the second through holes are designed as an aligning hole, and the other through holes are designed to have an offset compensating gap.

In one preferred embodiment of the utility model, the height of the light guide plate protrusions is equal to the sum of the thickness of one light-emitting body disposed on the printed circuit board and the optical-coupling distance.

In one preferred embodiment of the utility model, the printed circuit board disposes a first connecting terminal on one end of a back surface thereof, the back plate disposes more than two third through holes, the back plate also disposes a second connecting terminal positioned near the third through holes and corresponding to the first connecting terminal, and the first and second connecting terminals are electrically connected to each other.

Comparing with the prior art, the backlight module and the backlight device provided by the utility model may first combine the light guide plate, the printed circuit board and the heat-dissipating bracket together to form a module, and then combine the combined module with the back plate, so that enhancing the stability of the optical-coupling distance in the backlight module, realizing a simple modularization assembly, simplifying a mounting process of the back plate, and improving the assembly convenience. And under the cases of a positive construction and an inverse construction of the backlight module, the utility model also can obtain a same optical parameter for satisfying the market needing of the diversified assembly mode of the liquid crystal display module.

For more clearly and easily understanding above content of the utility model, the following text will take a preferred embodiment with reference to the accompanying drawings for detail description as follows.

DETAILED DESCRIPTION OF THE PREFERRED EMBODIMENTS

The following description of every embodiment with reference to the accompanying drawings is used to exemplify a specific embodiment, which may be carried out in the utility model. Directional terms mentioned in the utility model, such as "top", "bottom", "front", "back", "left", "right", "inside", "outside", "side" etc., are only used with reference to the orientation of the accompanying drawings. Therefore, the used directional terms are intended to illustrate, but not to limit, the utility model.

Figure 1:
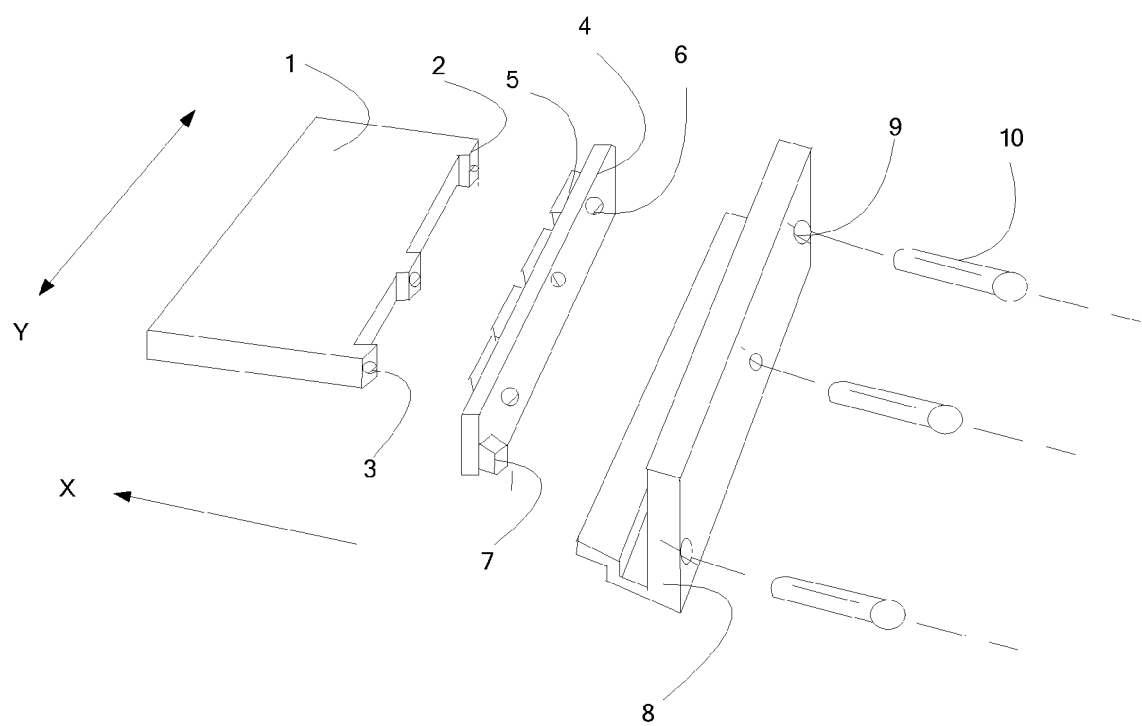
FIG. 1 is a structural schematic view of a preferred embodiment of a backlight module of the utility model.

As shown in FIG. 1, which is a structural schematic view of a preferred embodiment of a backlight module of the utility model. In FIG. 1, the backlight module of the utility model comprises a light guide plate 1, a printed circuit board 4, a heat-dissipating bracket 8 and a first retaining member 10.

A light incidence surface (namely a side surface) of the above light guide plate 1 disposes more than two light guide plate protrusions 2 thereon, the height of which is equal to the sum of the thickness of one light-emitting body 5 and the optical-coupling distance. Each of the light guide plate protrusion 2 is provided with a tapping hole 3 thereon. A front surface of the printed circuit board 4 disposes a number of the light-emitting bodies 5, such as light-emitting diode, arranged thereon. A back surface of the printed circuit board 4 disposes a first connecting terminal 7 on one end thereof for being electrically connected to a back plate. The printed circuit board 4 and the heat-dissipating bracket 8 respectively dispose more than two first through holes 6 and more than two second through holes 9, which are corresponding to the tapping holes 3. At least one of the first through holes and at lease one of the second through holes are designed as an aligning hole, and the other through holes are designed to have an offset compensating gap. In this embodiment, the aligning hole may be a round hole, and the other through holes having the offset compensating gap may be elliptical holes. The first retaining member 10 can pass through the second through hole 9, the first through hole 6 and the tapping hole 3 for orderly retaining the heat-dissipating bracket 8, the printed circuit board 4 and the light guide plate 1 together to form an independent backlight module, and for making the light guide plate protrusion 2 closely depend onto the light-emitting body 5. For detailed, please refer to FIG. 2, which is an assembled schematic view of the preferred embodiment of the backlight module of the utility model.

Because the first retaining member 10 may be freely adjusted, the optical-coupling distance between the light incidence surface of the light guide plate 1 and the printed circuit board 4 can be kept by adjusting the reservation length of the first retaining member 10 between the light incidence surface of the light guide plate 1 and the printed circuit board 4, and the tightness degree of fixing the light guide plate 1 can be adjusted by adjusting the first retaining member 10 thereby making the light guide plate 1 be capable of freely expanding along the direction (X) of the emitting light. The through holes having the offset compensating gap are designed for that the light guide plate 1 can freely expand along the direction (Y) perpendicular to the direction of the emitting light. Moreover, because a clearance is reserved on an opposite side of the light incidence surface of the light guide plate to provide an expansion space for the light guide plate, the first retaining member 10 can prevent the light guide plate 1 from moving toward the clearance and varying the optical-coupling distance.

Figure 3:
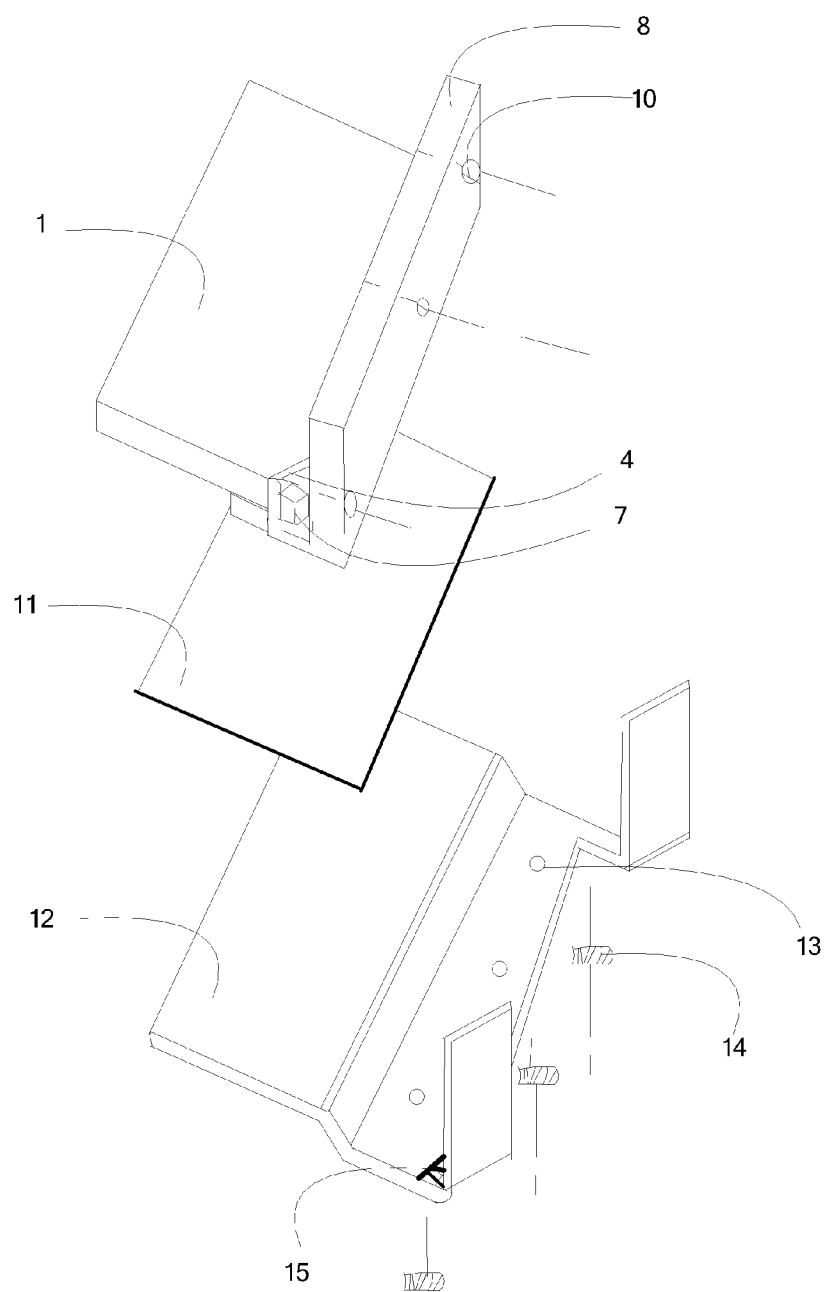
FIG. 3 is a structural schematic view of a preferred embodiment of a backlight device of the utility model.

Please refer to FIG. 3, which is a structural view of a backlight device of the utility model, the backlight device comprises a light guide plate 1, a printed circuit board 4, a heat-dissipating bracket 8, a first retaining member 10, a reflection sheet 11, a back plate 12 and a second retaining member 14.

Figure 2:
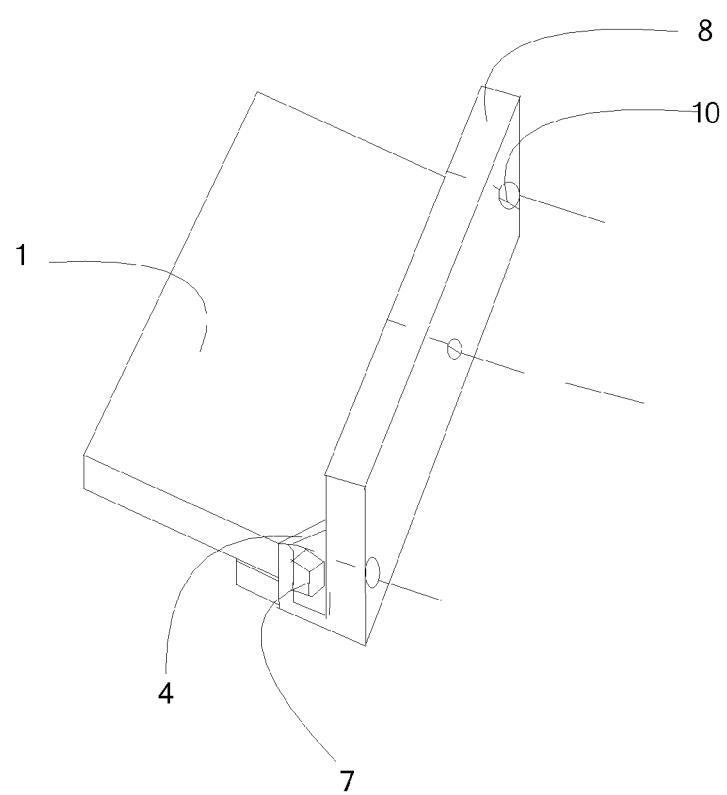
FIG. 2 is an assembled schematic view of the preferred embodiment of the backlight module of the utility model.
Figure 4:
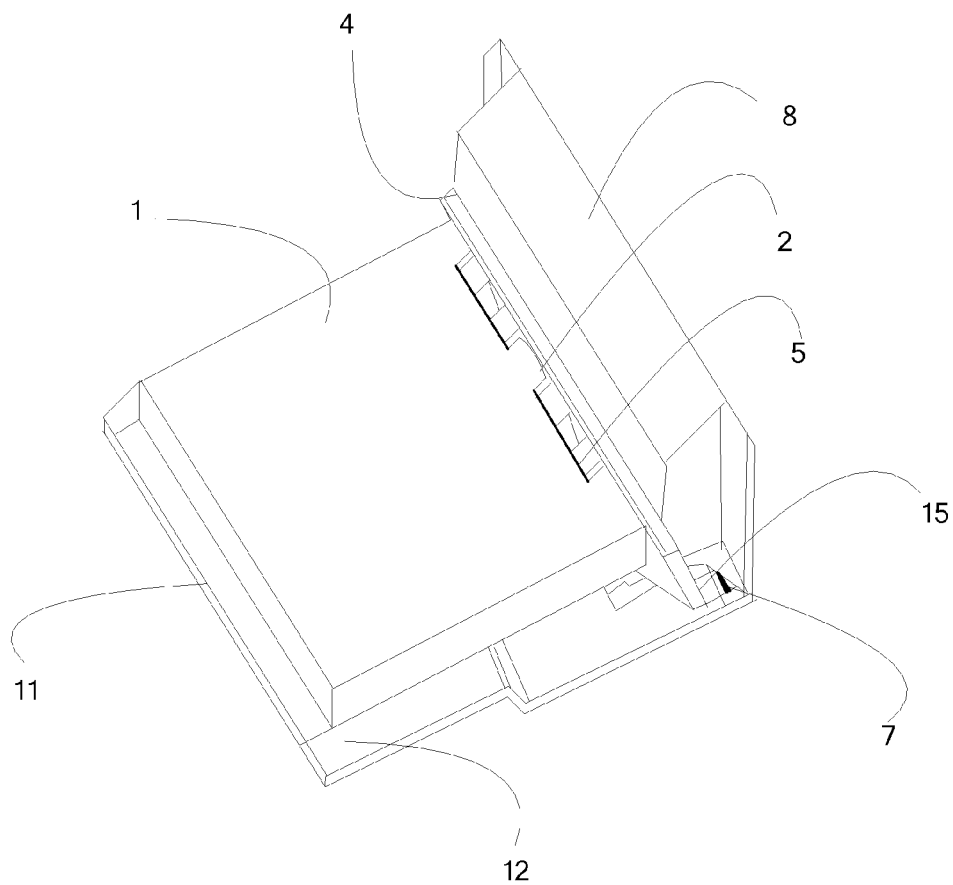
FIG. 4 is an assembled schematic view of the preferred embodiment of the backlight device of the utility model.

Please simultaneously refer to FIG. 2 and FIG. 3, in the backlight device of the utility model, a light incidence surface of the light guide plate 1 are provided with more than two light guide plate protrusions 2 thereon, the height of which is equal to the sum of the thickness of one light-emitting body 5 and the optical-coupling distance. Each light guide plate protrusion 2 is provided with a tapping hole 3 thereon. A front surface of the printed circuit board 4 disposes a number of the light-emitting bodies 5, such as light-emitting diode, arranged thereon. A back surface of the printed circuit board 4 disposes a first connecting terminal 7 on one end thereof for being electrically connected to a back plate. The printed circuit board 4 and the heat-dissipating bracket 8 are separately positioned more than two first through holes 6 and more than two second through holes 9, which are corresponding to the tapping holes 3. At least one of the first through holes and at lease one of the second through holes are designed as an aligning hole, and the other through holes are designed to have an offset compensating gap. In this embodiment, the aligning hole may be a round hole, and the other through holes having the offset compensating gap may be elliptical holes. The first retaining member 10 can pass through the second through hole 9, the first through hole 6 and the tapping hole 3 for orderly retaining the heat-dissipating bracket 8, the printed circuit board 4 and the light guide plate 1 together to form an independent backlight module, and for making the light guide plate protrusion 2 closely depend onto the light-emitting body 5. Moreover, the back plate 12 disposes more than two third through holes 13 thereon. The back plate 12 also disposes a second connecting terminal 15, which is positioned near the third through holes 13 and corresponding to the first connecting terminal 7. The second retaining member 14 orderly passes through the third through hole 13 on the back plate 12 and the through hole (not shown in all drawings) on the bottom of the heat-dissipating bracket 8 so that the back plate 12, the reflection sheet 11 and the backlight module provided by the utility model are mounted together, and the first connecting terminal 7 on the printed circuit board 4 is electrically connected to the second connecting terminal 15 near the third through holes 13 of the back plate 12. For detailed, please refer to FIG. 4, which is an assembled schematic view of the preferred embodiment of the backlight device of the utility model.

Because the first retaining member 10 may be freely adjusted, the optical-coupling distance between the light incidence surface of the light guide plate 1 and the printed circuit board 4 can be kept by adjusting the reservation length of the first retaining member 10 between the light incidence surface of the light guide plate 1 and the printed circuit board 4, and the tightness degree of fixing the light guide plate 1 can be adjusted by adjusting the first retaining member 10 thereby making the light guide plate 1 be capable of freely expanding along the direction (X) of the emitting light. The through holes having the offset compensating gap are designed for that the light guide plate 1 can freely expand along the direction (Y) perpendicular to the direction of the emitting light. Moreover, because a clearance is reserved on an opposite side of the light incidence surface of the light guide plate to provide an expansion space for the light guide plate, the first retaining member 10 can prevent the light guide plate 1 from moving toward the clearance and varying the optical-coupling distance. The backlight module after assembled is mounted onto the back plate 12 to obtain a more stable optical-coupling distance and at the same time to realize a simple engagement with the back plate 12, thereby simplifying the mounting process of the back plate and improving the assembly convenience.

In one preferred embodiment of the utility model, the first retaining member 10 and the second retaining member 14 are screws, and can be changed to other retaining member according to the different demands.

In the backlight module and the backlight device provided by the utility model, the light guide plate, the printed circuit board and the heat-dissipating bracket together are combined together to form a module, and then the combined module is mounted onto the back plate, so that enhancing the stability of the optical-coupling distance in the backlight module, realizing a simple modularization assembly, simplifying a mounting process of the back plate, and improving the assembly convenience. And under the cases of a positive construction and an inverse construction of the backlight module, the utility model also can obtain a same optical parameter for satisfying the market needing of the diversified assembly mode of the liquid crystal display module.

In conclusion, although the utility model has been disclosed by above preferred embodiments, above preferred embodiments are not used to limit the utility model. One of ordinary skills in the art also can make all sorts of improvements and amendments within the principles of the utility model. Therefore, the protection scope of the utility model should be based on the scope defined by the appended claims

What is claimed is:

1. A backlight module, comprising:
   a light guide plate having a light incidence surface, which disposes more than two light guide plate protrusions thereon, and each of the light guide plate protrusions being provided with a tapping hole;
   a printed circuit board being provided with more than two first through holes, and disposing a plurality of light-emitting bodies on a front surface of the printed circuit board;
   a heat-dissipating bracket being provided with more than two second through holes, and the first and second through holes being corresponding to the tapping hole; and
   a first retaining member passing through the second through hole, the first through hole and the tapping hole for retaining the heat-dissipating bracket, the printed circuit board and the light guide plate together to form an independent module;
   wherein the light incidence surface of the light guide plate and a front surface of all the light-emitting bodies define an optical-coupling distance therebetween.

2. The backlight module as claimed in claim 1, wherein at least one of the first through holes and at least one of the second through holes are designed as an aligning hole, and the other through holes are designed to have an offset compensating gap.

3. The backlight module as claimed in claim 1 or 2, wherein the height of the light guide plate protrusions is equal to the sum of the thickness of one light-emitting body disposed on a front surface of the printed circuit board and the optical-coupling distance.

4. A backlight device, comprising:
   a light guide plate having a light incidence surface, which disposes more than two light guide plate protrusions thereon, and each of the light guide plate protrusions being provided with a tapping hole;
   a printed circuit board being provided with more than two first through holes corresponding to the tapping holes, and disposing a plurality of light-emitting bodies on a front surface of the printed circuit board;
   a heat-dissipating bracket being provided with more than two second through holes corresponding to the tapping holes;
   a reflection sheet;
   a back plate disposing more than two third through holes;
   a first retaining member passing through the second through hole, the first through hole and the taping hole for retaining the heat-dissipating bracket, the printed circuit board and the light guide plate together to form an independent backlight module, and
   a second retaining member passing through the third through hole to connect and retain the back plate, the reflection sheet and the backlight module,
   wherein the light incidence surface of the light guide plate and a front surface of all the light-emitting bodies define an optical-coupling distance therebetween.

5. The backlight device as claimed in claim 4, wherein at least one of the first through holes and at lease one of the second through holes are designed as an aligning hole, and the other through holes are designed to have an offset compensating gap.

6. The backlight device as claimed in claim 4, wherein the height of the light guide plate protrusions is equal to the sum of the thickness of one light-emitting body disposed on the printed circuit board and the optical-coupling distance.

7. The backlight device as claimed in claim 4, wherein the printed circuit board disposes a first connecting terminal on one end of a back surface thereof, the back plate also disposes a second connecting terminal positioned near the third through holes and corresponding to the first connecting terminal, and the first and second connecting terminals are electrically connected to each other.

\* \* \* \* \*